United States Patent
Choi et al.

(10) Patent No.: US 10,588,080 B2
(45) Date of Patent: *Mar. 10, 2020

(54) DIGITAL SIGNAL PROCESSING DEVICE OF BASE STATION AND METHOD FOR PROCESSING DATA THEREOF

(71) Applicant: Samsung Electronics Co., Ltd., Suwon-si, Gyeonggi-do (KR)

(72) Inventors: Yonghae Choi, Seongnam-si (KR); Hanseok Kim, Seoul (KR); Seongyong Park, Seongnam-si (KR); Jeongjae Won, Hwaseong-si (KR); Junsung Lee, Guri-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,186

(22) Filed: Jul. 30, 2018

(65) Prior Publication Data

US 2018/0338279 A1 Nov. 22, 2018

Related U.S. Application Data

(63) Continuation of application No. 15/075,627, filed on Mar. 21, 2016, now Pat. No. 10,039,054.

(30) Foreign Application Priority Data

Mar. 27, 2015 (KR) .......................... 10-2015-0043038

(51) Int. Cl.
*H04W 52/02* (2009.01)
*G06F 1/12* (2006.01)
*H04L 5/00* (2006.01)

(52) U.S. Cl.
CPC .......... *H04W 52/0206* (2013.01); *G06F 1/12* (2013.01); *H04W 52/029* (2013.01);
(Continued)

(58) Field of Classification Search
CPC .......... H04W 52/0206; H04W 52/029; H04W 52/0225; G06F 1/12; H04L 5/0048; Y02B 60/50
See application file for complete search history.

(56) References Cited

U.S. PATENT DOCUMENTS

| 9,055,531 B2 | 6/2015 | Goel et al. |
| 2004/0146030 A1 | 7/2004 | Hsieh et al. |

(Continued)

FOREIGN PATENT DOCUMENTS

| KR | 10-2012-0018266 A | 3/2012 |
| KR | 10-2014-0072124 A | 6/2014 |

*Primary Examiner* — Min Jung
(74) *Attorney, Agent, or Firm* — Jefferson IP Law, LLP

(57) ABSTRACT

A digital signal processing device of a base station configured to process down-link signals in a wireless communication system employing orthogonal frequency division multiple access (OFDMA) and a method of processing data in the device are provided. The device includes a clock controller configured to monitor whether a signal is allocated to an input and control a frequency of clocks to have a first or second characteristic based on the monitored result, and a data processor configured to process the input, and synchronize with the clock controlled by the clock controller.

20 Claims, 7 Drawing Sheets

(52) U.S. Cl.
CPC ....... *H04W 52/0225* (2013.01); *H04L 5/0048* (2013.01); *Y02D 70/00* (2018.01); *Y02D 70/1262* (2018.01); *Y02D 70/1264* (2018.01); *Y02D 70/142* (2018.01); *Y02D 70/146* (2018.01); *Y02D 70/168* (2018.01)

(56) References Cited

U.S. PATENT DOCUMENTS

| | | |
|---|---|---|
| 2004/0258185 A1* | 12/2004 | Kihara ................. H04B 1/1027 375/371 |
| 2010/0138549 A1 | 6/2010 | Goel et al. |
| 2011/0043707 A1* | 2/2011 | Umezu ............. H04N 21/4122 348/723 |
| 2012/0015657 A1 | 1/2012 | Comsa et al. |
| 2012/0044845 A1 | 2/2012 | Lee et al. |
| 2013/0059546 A1 | 3/2013 | Lum et al. |
| 2013/0149972 A1 | 6/2013 | Luong et al. |
| 2013/0272180 A1 | 10/2013 | Hiremath et al. |
| 2014/0157023 A1 | 6/2014 | Katou |
| 2014/0248913 A1* | 9/2014 | Kuppusamy ............ H04L 67/22 455/456.3 |
| 2014/0254496 A1 | 9/2014 | Olfat |
| 2015/0022271 A1 | 1/2015 | Winiecki et al. |
| 2016/0073379 A1* | 3/2016 | Yang .................... H04W 28/20 370/329 |

\* cited by examiner

DIGITAL SIGNAL PROCESSING DEVICE OF BASE STATION AND METHOD FOR PROCESSING DATA THEREOF

CROSS-REFERENCE TO RELATED APPLICATION(S)

This application is a continuation application of prior application Ser. No. 15/075,627, filed on Mar. 21, 2016, and claimed priority under 35 U.S.C. § 119(a) of a Korean patent application number 10-2015-0043038, filed on Mar. 27, 2015, in the Korean Intellectual Property Office, the disclosure of which is incorporated by reference herein in its entirety.

TECHNICAL FIELD

The present disclosure relates to a digital signal processing device of a base station and a method of processing data in the device. More particularly, the present disclosure relates to a system for effectively distributing power in an interval where the digital signal processing unit of an evolved node B (eNB) performs a data processing function, thereby reducing the overall power consumption.

BACKGROUND

Mobile communication systems have been developed to provide voice call services, supporting users' mobility. With the development of communication technology, they have recently provided data communication services at a high data transfer rate. To this end, mobile communication systems are evolved to worldwide interoperability for microwave access (WiMAX), long term evolution (LTE), and the like, employing orthogonal frequency-division multiple access (OFDMA).

In LTE systems as the 4th generation mobile communication technology, evolved node Bs (eNBs) are capable of transmitting user traffic to user equipment (UE) via cells. For example, an eNB transmits, to UE, control channel signals including control information and data channel signals including data, such as user traffic. User traffic is allocated to data channels according to a request from UE. Control information is allocated to control channels. In addition, a reference signal for estimating a channel of UE is repeatedly allocated to channels and transmitted to the UE. Control channel signals and data channel signals are allocated to resource blocks. According to the real-time monitoring result of signal usage in resource block for each cell, a situation that user traffic is not allocated happens very frequently. A situation that user traffic increases up to maximum 95% per day also happens very often.

As described above, a situation happens very frequently that user traffic is not allocated to down-link signals processed by an eNB. For example, although a digital signal processing unit of an eNB does not transmit user traffic to a user equipment (UE), the digital signal processing unit needs to process data for a corresponding signal in order to transmit, to the UE, downlink control information, a periodically created reference signal, and the like.

Therefore, a need exists for a system for effectively distributing power in an interval where the digital signal processing unit of an eNB performs a data processing function, thereby reducing the overall power consumption.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a system for effectively distributing power in an interval where the digital signal processing unit of an evolved node B (eNB) performs a data processing function, thereby reducing the overall power consumption.

Another aspect of the present disclosure is to provide a device for processing digital signals and a method of processing data in the base station.

In accordance with an aspect of the present disclosure, a digital signal processing device of a base station, configured to process down-link signals in a wireless communication system employing orthogonal frequency division multiple access (OFDMA), is provided. The device includes a clock controller configured to monitor whether a signal is allocated to an input and control a frequency of clocks to have a first or second characteristic based on the monitored result, and a data processor configured to process the input and synchronize with the clock controlled by the clock controller.

In accordance with another aspect of the present disclosure, a digital signal processing device of a base station, configured to process down-link signals in a wireless communication system employing OFDMA, is provided. The device includes a buffer configured to buffer an input, a clock controller configured to monitor whether a signal is allocated to the input and generate a clock selection control signal, a clock providing unit configured to provide first and second clocks that differ from each other in terms of frequency characteristic, a multiplexer configured to output the first or second clock in response to the clock selection control signal, and a data processor configured to process the input buffered in the buffer and synchronize with the clock output from the multiplexer.

In accordance with another aspect of the present disclosure, a method of processing data in a digital signal processing device of a base station, configured to process down-link signals in a wireless communication system employing OFDMA, is provided. The method includes monitoring whether a signal is allocated to an input, providing, when ascertaining that a signal is allocated to an input, a clock of a first frequency characteristic to a data processor configured to process data, and providing, when ascertaining that a signal is not allocated to an input, a clock of a second frequency characteristic to the data processor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
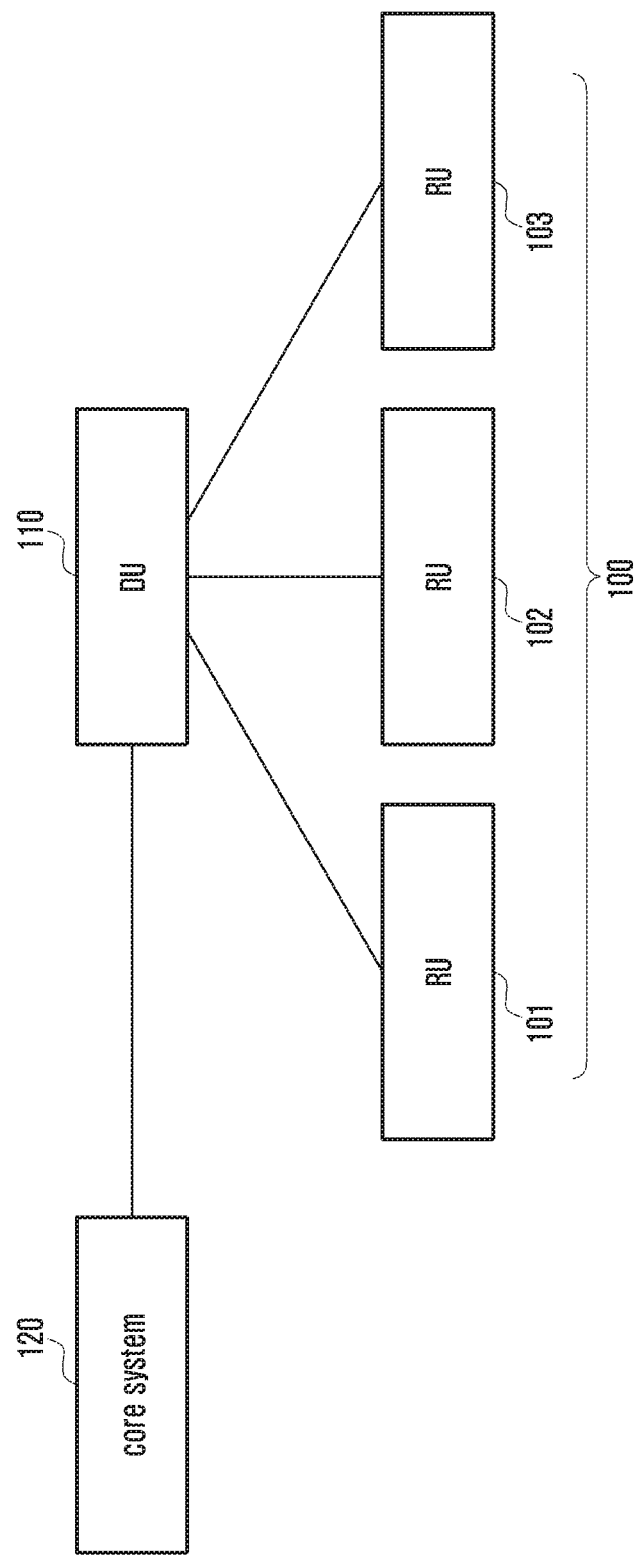
FIG. 1 is a schematic block diagram of a long term evolution (LTE) network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used in an embodiment of the present disclosure, the expression "include" or "may include" refers to the existence of a corresponding function, operation, or constituent element, and does not limit one or more additional functions, operations, or constituent elements. Further, as used in an embodiment of the present disclosure, the term, such as "include" or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

As used in an embodiment of the present disclosure, the expression "or" includes any or all combinations of words enumerated together. For example, the expression "A or B" may include A, may include B, or may include both A and B.

While expressions including ordinal numbers, such as "first" and "second", as used in an embodiment of the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Although the present disclosure is described based on long term evolution (LTE) systems and LTE-advanced (LTE-A) systems, it should be understood that the present disclosure may also be applied to other types of wireless communication systems employing the orthogonal frequency division multiplexing (OFDM) transmission technique.

OFDM is a method of transmitting data via multi-carriers. OFDM is a form of multi-carrier modulation (MCM) that divides a serial symbol stream into parallel symbol streams, modulates them into sub-carrier channels that are orthogonal to each other, and transmits them.

With the development of technology, the OFDM transmission technique is applied to digital transmission technology, such as, digital audio broadcasting (DAB), digital video broadcasting (DVB), wireless local area network (WLAN), wireless asynchronous transfer mode (WATM), and the like. For example, OFDM has not been applied to systems due to the hardware complexity until digital signal process technology, such as fast fourier transform (FFT), inverse FFT (IFFT), and the like, was developed.

In OFDM, modulation signals are expressed in two dimensional resources of time and frequency. The resource over time axis includes different OFDM symbols that are orthogonal each other. The resource over frequency axis includes different sub-carriers that are orthogonal each other. For example, if an OFDM symbol is set over a time axis and a sub-carrier is also set over a frequency axis, one minimum unit resource can be set, which is hereafter called resource element (RE). Although different REs pass through a frequency selective channel, they still have orthogonality. Therefore, signals transmitted via different REs can be transmitted to the receiver, without interference.

Physical channels refer to channels of physical layers that transmit modulation symbols created as one or more encoded bit streams are modulated. An orthogonal frequency division multiple access (OFDMA) system configures a number of physical channels according to the use of data stream that will be transmitted or the types of receivers, and performs data transmission. Arranging one physical channel to an RE and transmitting data via the channel need to be preset between a transmitter and a receiver, and the process is called 'mapping.'

The LTE system is a typical example of the wireless communication systems that employs OFDM in the down-link and single carrier-frequency division multiple access (SC-FDMA) in the uplink. The LTE-A system refers to an LTE system configured to extend its serving band to multi-bands. A relay is applied to LTE-A systems.

FIG. 1 is a schematic block diagram of an LTE network according to an embodiment of the present disclosure.

Referring to FIG. 1, the LTE network is capable of including a radio signal processing unit (short for radio unit (RU)) 100, a digital signal processing unit (short for digital unit (DU)) 110 and a core system 120. RU 100 and DU 110 form a wireless communication signal processing system.

The RU 100 processes radio signals. The RU 100 converts digital signals received from the DU 110 into radio frequency (RF) signals and amplifies the amplitude according to frequency bands. The RU 100 transmits RF signals to user equipment (UE) via the antenna. The RU 100 processes signals, received from UE via the antenna, and transfers the processes signals to the DU 110. The RU 100 may be configured to include a number of RUs 101, 102, and 103 which are connected to the DU 110 and installed in corresponding service areas, respectively. The RU 100 and the DU 110 may be connected to each other with an optical fiber cable.

The DU 110 performs the encoding and decoding processes for radio digital signals. The DU 110 is connected to the core system 120. In order to process down-link signals, the DU 110 encodes control information allocated to a control channel and data allocated to a data channel, and performs inphase/quadrature (IQ) modulation to create IQ data. A data processor (not shown) included in the DU 110 processes IQ data which is digital signals, so that the IQ data can be transmitted to RU 100 via an optical fiber cable. For example, the data processor (not shown) compresses IQ data and/or converts IQ data to optical signals.

Data of a data channel is allocated only when UE requests user traffic. For example, data may not be allocated to a data channel except that UE requests user traffic. IQ data related to control information and reference signals may be periodically created. However, IQ data related to data including user traffic may not be created without a user's request or a specific event.

Therefore, inputs received by the data processor (not shown) may or may not include a signal (e.g., IQ data). The DU 110 controls a frequency of clocks provided to the data processor (not shown) according to whether the input include a signal, thereby reducing power consumption of the data processor. The method of controlling a frequency of clocks provided to the data processor will be described below through various embodiments referring to FIGS. 2 to 4.

Unlike the RU 100, the DU 110 may not be installed in an area to receive services. The DU 110 refers to servers generally installed in telecommunication buildings. An example of the DU 1 is a virtualized evolved node B (eNB). The DU 110 is capable of transmitting/receiving signals to/from the RU 100 of a number of RUs.

The eNB is implemented with one physical system including processors corresponding to the RU 100 and DU 110, respectively. The physical system may be installed to an area to receive services. The eNB may be configured in such a way that the RU 100 and the DU 110 are physically separated from each other, and, in this case, only the RU 100 is installed to an area to receive services.

The core system 120 processes the connection between the DU 110 and an external network. The core system 120 may include a switching system (not shown).

Figure 2:
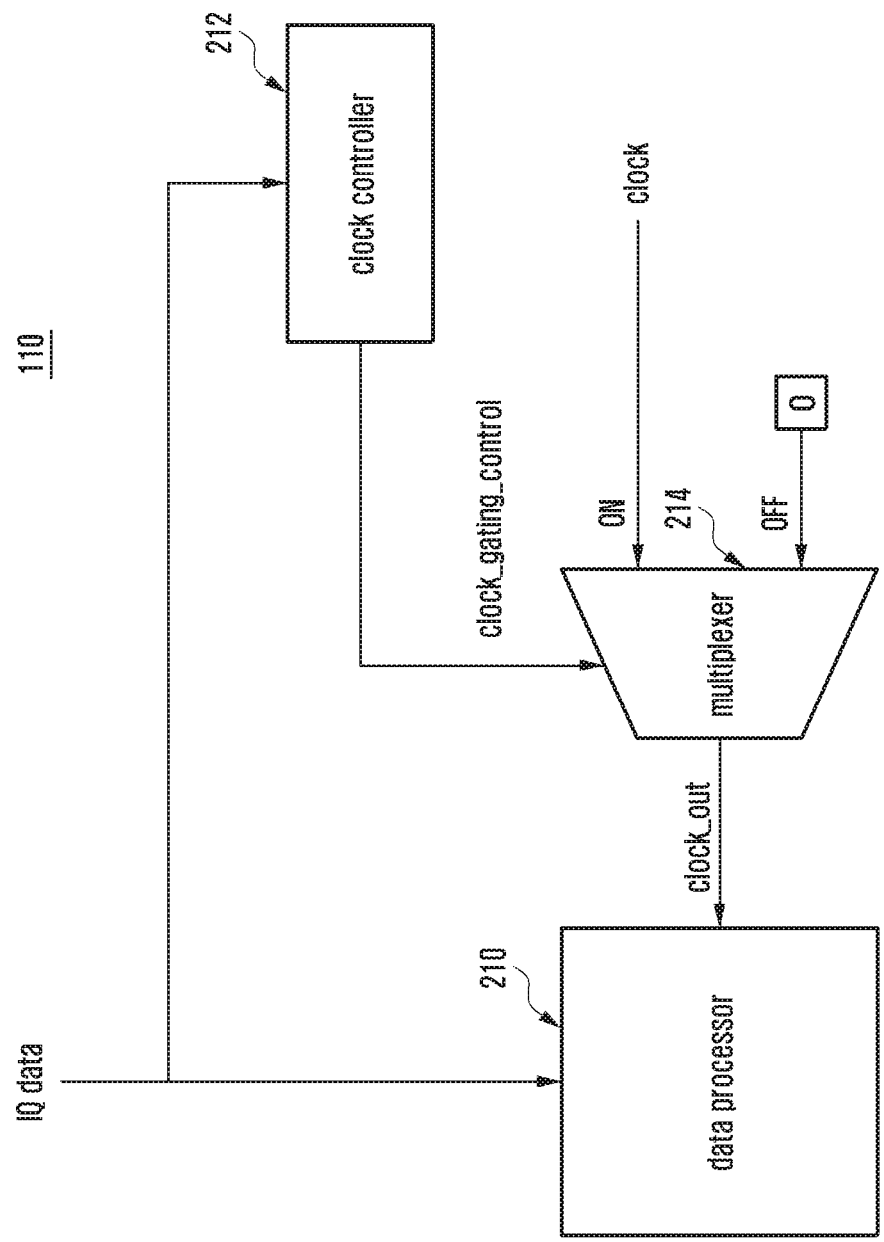
FIG. 2 is a schematic block diagram of a digital signal processing unit of an evolved node B (eNB) according to an embodiment of the present disclosure.

FIG. 2 is a schematic block diagram of a digital signal processing unit of an eNB according to an embodiment of the present disclosure.

Referring to FIG. 2, the DU 110 is capable of including a data processor 210, a clock controller 212, and a multiplexer 214.

The data processor 210 processes a signal, IQ_data, included in the received input, synchronizing with a clock signal, clock_out. The clock_out provides electric power to the data processor 210 and enables the data processor 210 to synchronize the data processing. Although the embodiment describes the input based on IQ data, it should be understood that the input may also include various types of signals processed in synchronization with clocks. As described above, the input may or may not be allocated a signal, IQ_data.

The clock controller 212 is capable of monitoring whether a signal, IQ_data, is allocated to the input of the data processor 210, and controlling the clock signal, clock_out, to the data processor 210. The monitoring process may be performed in real-time. When the clock controller 212 detects a signal, IQ_data, allocated to the input, the clock controller 212 is capable of providing the clock signal, clock_out, to the data processor 210. When the clock controller 212 ascertains that a signal, IQ_data, is not allocated to the input, the clock controller 212 is capable of gating the clock signal, clock_out, to the data processor 210.

For example, when the clock controller 212 detects a signal, IQ_data, allocated to the input, the clock controller 212 is capable of providing a first level of clock gating control signal, first clock_gating_control, to a multiplexer 214. When the multiplexer 214 receives the first clock_gating_control, the multiplexer 214 is capable of selecting a clock signal and providing the clock signal to the data processor 210. On the other hand, when the clock controller 212 ascertains that a signal, IQ_data, is not allocated to the input, the clock controller 212 is capable of providing a second level of clock gating control signal, second clock_gating_control, to the multiplexer 214. When the multiplexer 214 receives the second clock_gating_control, the multiplexer 214 is capable of gating the clock signal to the data processor 210.

Therefore, the DU 110 provides the clock signal to the data processor 210 only when the input includes a signal, IQ_data, so that the data processor 210 can only process data, synchronizing with the clock signal.

Figure 3:
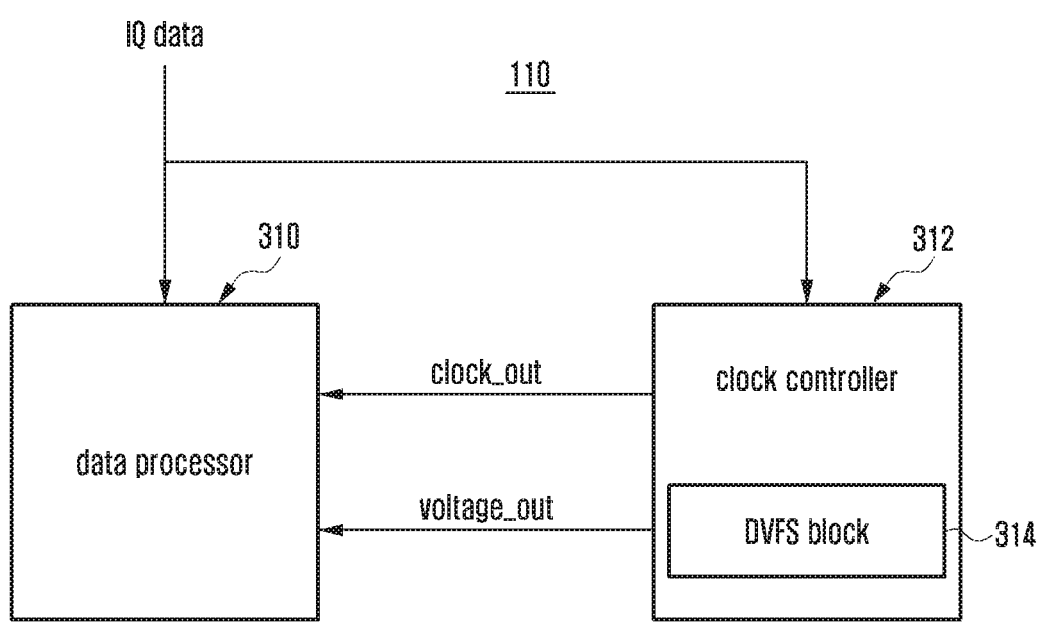
FIG. 3 is a schematic block diagram of a digital signal processing unit of an eNB according to an embodiment of the present disclosure.

FIG. 3 is a schematic block diagram of a digital signal processing unit according to an embodiment of the present disclosure.

Referring to FIG. 3, the DU 110 is capable of including a data processor 310 and a clock controller 312.

The data processor 310 processes a signal, IQ_data, included in the received input, synchronizing with a clock signal, clock_out, based on a voltage, voltage_out. The voltage_out and clock_out provide electric power to the data processor 310, and the clock_out enables the data processor 310 to synchronize the data processing. Although the embodiment describes the input based on IQ data, it should be understood that the input may also include various types of signals processed in synchronization with clocks. As described above, the input may or may not be allocated a signal, IQ_data.

The clock controller 312 is capable of monitoring whether a signal, IQ_data, is allocated to the input of the data processor 310, and controlling the clock signal, clock_out, and the voltage signal, voltage_out, to the data processor 310. The monitoring process may be performed in real-time. For example, a dynamic voltage and frequency scaling (DVFS) block 314 included in the clock controller 312 is capable of monitoring an amount of IQ_data allocated to the input, scaling the frequency of the clock_out so that the data processor 310 can optimally process data, and scaling the voltage_out.

Figure 4:
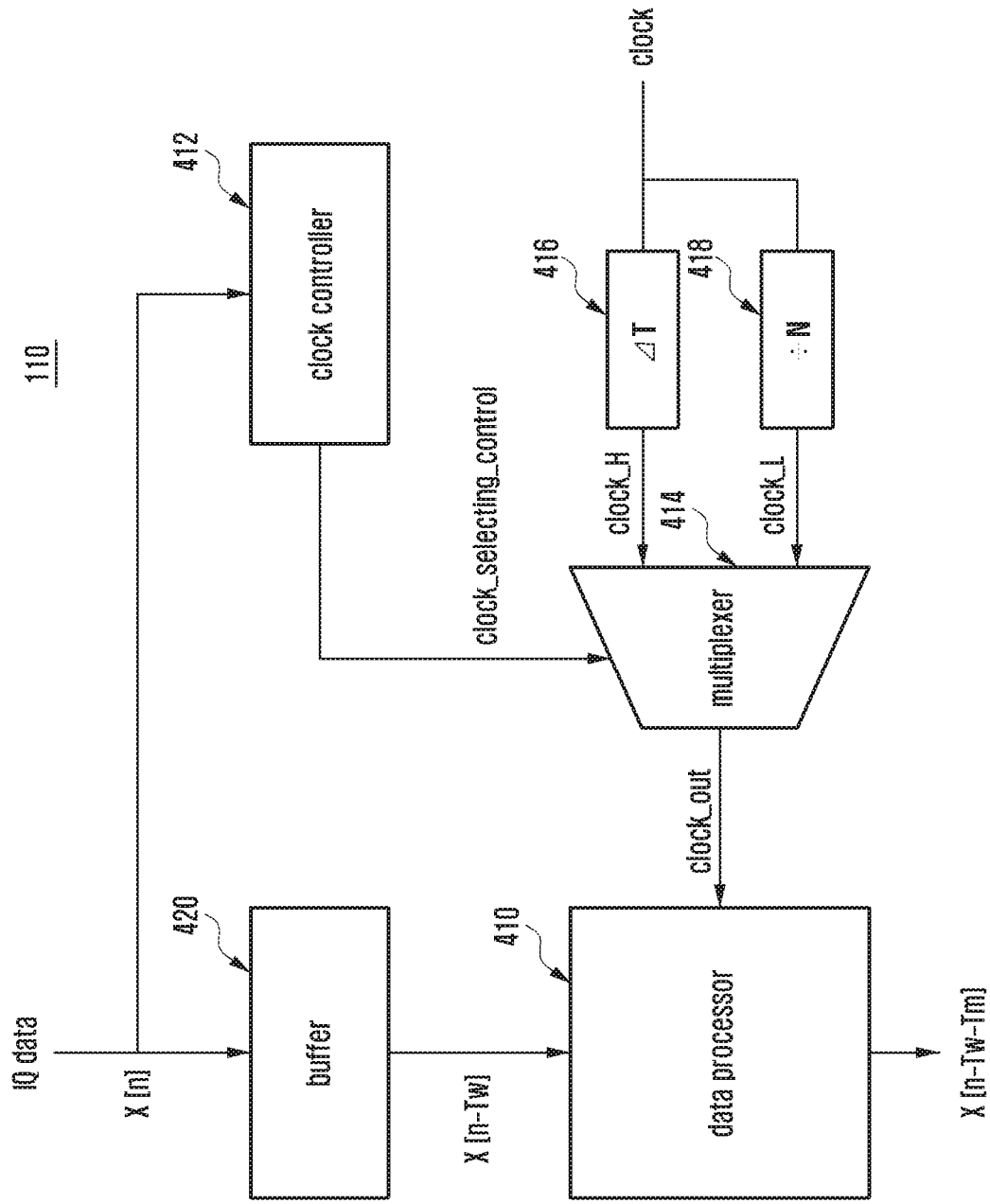
FIG. 4 is a schematic block diagram of a digital signal processing unit of an eNB according to an embodiment of the present disclosure.

FIG. 4 is a schematic block diagram of a digital signal processing unit according to an embodiment of the present disclosure.

Referring to FIG. 4, the DU 110 is capable of including a data processor 410, a clock controller 412, and a multiplexer 414.

The data processor 410 processes a signal, IQ_data, included in the received input, synchronizing with clock signal, clock_out. Although the embodiment describes the input based on IQ data, it should be understood that the input may also include various types of signals processed in synchronization with clocks. As described above, the input may or may not be allocated a signal, IQ_data.

The clock controller 412 is capable of monitoring whether a signal, IQ_data, is allocated to the input of the data processor 410, and controlling the frequency of the clock signal, clock_out, provided to the data processor 410. For example, the clock controller 412 is capable of controlling the clock signal, clock_out, in a low frequency, in an initial state where the signal, IQ_data, is not allocated to the input of the data processor 410. When the clock controller 412 detects a signal, IQ_data, allocated to the input, the clock controller 412 is capable of controlling the clock signal, clock_out, in a high frequency. In an embodiment of the present disclosure, the terms 'low' and 'high' in the low frequency and high frequency of a clock signal are used represent relative values to each other. For example, a high frequency refers to a frequency relatively greater than a low frequency.

For example, when the clock controller 412 detects a signal, IQ_data, allocated to the input, the clock controller 412 is capable of providing a first level of clock selecting control signal, first clock_selecting_control, to a multiplexer 414. When the multiplexer 414 receives the first clock_selecting_control, the multiplexer 414 is capable of selecting a relatively high frequency clock signal, clock_H, to provide the relatively high frequency clock signal to the data processor 410. On the other hand, when the clock controller 412 ascertains that a signal, IQ_data, is not allocated to the input, the clock controller 412 is capable of providing a second level of clock selecting control signal, second clock_selecting_control, to a multiplexer 414. When the multiplexer 414 receives the second clock_selecting_control, the multiplexer 414 is capable of providing a relatively low frequency clock signal, clock_L, to the data processor 410.

For example, the DU 110 may use a reference clock, clock, for the high frequency clock, clock_H. The UD 110 may also use the low frequency clock, clock_L, into which a divider 418 divides the reference clock, clock. In order to adjust a clock delay difference by the divider 418, the DU 110 may further include a delay 416 delaying a period of time (or a delay time), ΔT.

The DU 110 may further include a buffer 420 with a delay time Tw, so that the data processor 410 can process data of the input signal, IQ_data, after a clock signal, clock_out, stabilized by the clock controller 412 and multiplexer 414, is provided to the data processor 410. For example, the delay time Tw refers to a period of time required for stabilization of the clock signal provided to the data processor 410. The delay time Tw is preset to the buffer 420.

When the clock controller 412 detects a signal, IQ_data, allocated to the input, the clock controller 412 may control the clock signal, clock_out, in a relatively high frequency. The clock controller 412 $t$ does not detect a signal, IQ_data, from the input until a period of time has elapsed, the clock controller 412 may control the clock signal, clock_out, in a relatively low frequency. The period of time may be a value which is set to the clock controller 412, considering a delay time Tw of the buffer 420 and/or a data processing time Tm that the data processor 410 inherently takes to process data.

For example, the clock controller 412 is capable of monitoring a signal, X[n], included in a buffer input and outputting a clock selecting control signal, clock_selecting_control, in a first level. Therefore, a relatively high frequency clock signal, clock_out, can be provided to the data processor 410 after the time required for stabilization of the clock signal has elapsed. The data processor 410 is capable of receiving a signal, X[n−Tw], delayed by a delay time Tw by the buffer 420, and processing the received signal, X[n−Tw], synchronizing with a clock signal, clock_out, controlled in a relatively high frequency, to output the processed result, X[n−Tw−Tm]. Since the clock controller 412 detected a signal, IQ_data, allocated to the input, when the clock controller 412 does not detect a signal X[n] until the delay time Tw of the buffer 420 and/or the data processing time Tm of the data processor 410 has elapsed, the clock controller 412 may output a clock selecting control signal, clock_selecting_control, in a second level. For example, any signal is not allocated to the input of the data processor 410 after the time required for stabilization of the clock signal has elapsed. In this case, the data processor 410 receives a relatively low frequency clock signal, clock_out. Therefore, when the data processor 410 does not process data substantially, the data processor 410 can operate in a relatively low frequency, thereby reducing the power consumption. When the data processor 410 is turned on/off by gating the clocks, the data processor 410 may consume a relatively large amount of electric power to the initial setting. Since the embodiment controls the frequency of clock, the power consumption for the initial setting of the data processor 410 can be reduced.

On the other hand, when the clock controller 412 detects a signal, IQ_data, allocated to the input, the clock controller 412 may control the clock signal, clock_out, in a relatively high frequency. The clock controller 412 still detects a signal, IQ_data, from the input after a period of time has elapsed. This indicates that the data processor 410 still receives data to be processed. In this case, the clock controller 412 is capable of maintaining the clock signal, clock_out, in a relatively high frequency.

Figure 5:
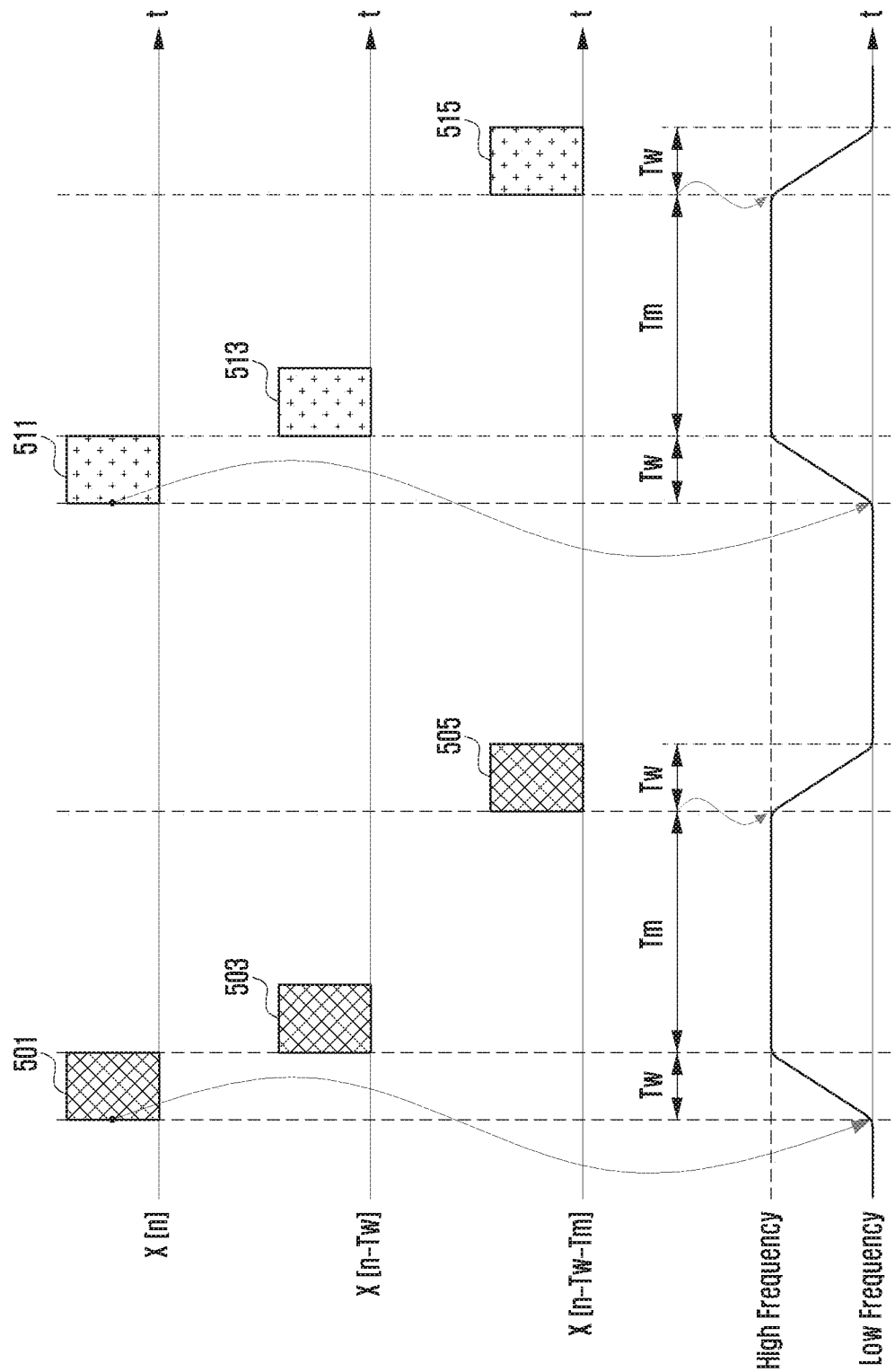
FIG. 5 is a timing diagram illustrating a data processing method according to an embodiment of the present disclosure.
Figure 6:
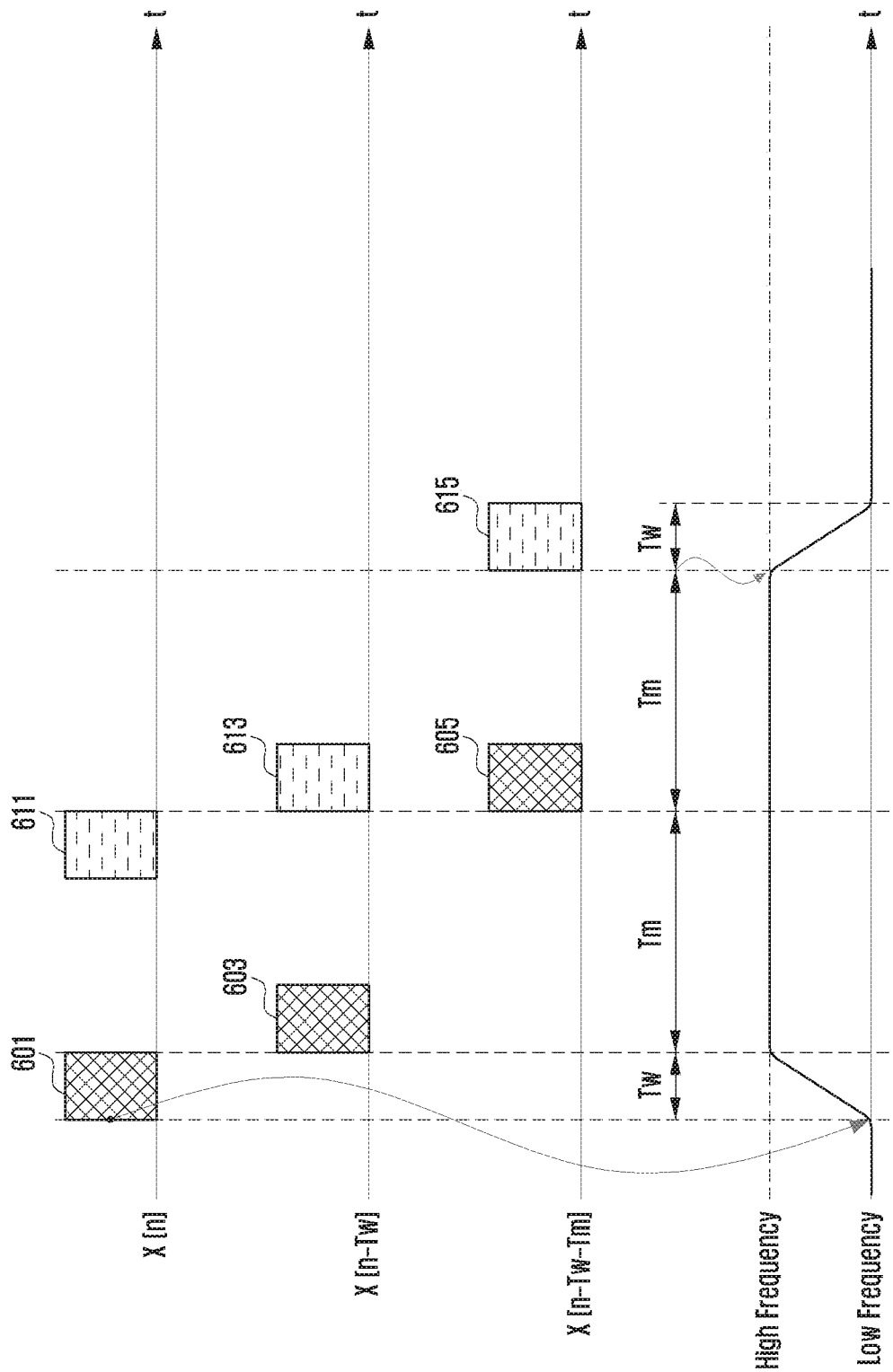
FIG. 6 is a timing diagram illustrating a data processing method according to an embodiment of the present disclosure.

FIGS. 5 and 6 are timing diagrams illustrating a data processing method according to various embodiments of the present disclosure.

Referring to FIG. 5, when a signal X[n] is allocated to the input of the buffer 420, the clock controller 412 is capable of monitoring the signal X[n] to control the frequency of the clock signal, clock_out, provided to the data processor 410. For example, when the clock controller 412 detects a first signal 501 allocated to the input of the buffer 420, the clock controller 412 is capable of controlling the clock signal, clock_out, in a relatively high frequency. The clock signal, clock_out, may be stabilized after the time required for stabilization of the clock signal has elapsed.

The buffer 420 is capable of delaying the signal X[n] by a delay time Tw corresponding to the time required for stabilization of the clock signal and outputting the delayed signal X[n−Tw]. Therefore, the buffer 420 is capable of providing a delayed signal 503, which corresponds to the first signal 501 delayed by the delay time Tw, to the data processor 410. The data processor 410 processes the received signal, synchronizing with a relatively high frequency clock signal, clock_out, and outputs the processed signal X[n−Tw−Tm]. For example, the data processor 410 may process signals over its inherent data processing time Tm. The data processor 410 is capable of processing the output signal 503 of the buffer 420, synchronizing with a relatively high frequency clock signal, clock_out, and outputting a processed signal 505.

Since the clock controller 412 detected the first signal 501, when the clock controller 412 does not detect a signal from the input of the buffer 420 until a period of time, e.g., a delay time Tw of the buffer 420 and an inherent data processing time Tm of the data processor 410, has elapsed, the clock controller 412 may control the clock signal, clock_out, in a relatively low frequency. The clock signal, clock_out, may be stabilized after the time required for stabilization of the clock signal has elapsed.

After the clock signal, clock_out, is stabilized to a low frequency, a second signal 511 may be allocated to the input of the buffer 420. In this case, the frequency of the clock signal, clock_out, may be controlled as in the above description for the first signal 501. For example, when the clock controller 412 detects the second signal 511, the clock controller 412 may control the clock signal, clock_out, in a relatively high frequency. The buffer 420 is capable of providing an output signal 513, which corresponds to the second signal 511 delayed by the delay time Tw, to the data processor 410. The data processor 410 is capable of processing the output signal 513 of the buffer 420, synchronizing with a relatively high frequency clock signal, clock_out, and outputting a processed signal 515. Since the clock controller 412 detected the second signal 511, when the clock controller 412 does not detect a signal from the input of the buffer 420 until a period of time, e.g., a delay time Tw of the buffer 420 and an inherent data processing time Tm of the data processor 410, has elapsed, the clock controller 412 may control the clock signal, clock_out, in a relatively low frequency.

Referring to FIG. 6, when a first signal 601 is allocated to the input of the buffer 420, the clock controller 412 is capable of detecting the first signal 601 and controlling the clock signal, clock_out, in a relatively high frequency. The buffer 420 is capable of providing an output signal 603, which corresponds to the first signal 601 delayed by a delay time Tw, to the data processor 410. The data processor 410 is capable of processing the output signal 603 of the buffer 420, synchronizing with a relatively high frequency clock signal, clock_out, and outputting a processed signal 605. Since the clock controller 412 detected the first signal 601, the clock controller 412 is capable of determining whether the clock controller 412 detects a signal from the input of the buffer 420 when a period of time, e.g., a delay time Tw of the buffer 420 and an inherent data processing time Tm of the data processor 410, has elapsed. In an embodiment of the present disclosure, the clock controller 412 may detect a second signal 611 allocated to the input of the buffer 420 when a period of time, Tw+Tm, has elapsed. Therefore, the clock controller 412 is capable of maintaining the clock signal, clock_out, in a relatively high frequency, instead of controlling the clock signal, clock_out, in a relatively low frequency.

The buffer 420 is capable of providing an output signal 613, which corresponds to the second signal 611 delayed by a delay time Tw, to the data processor 410. The data processor 410 processes the output signal 613 of the buffer 420, synchronizing with a relatively high frequency clock signal, clock_out, and outputs a processed signal 615. Since the clock controller 412 detected the second signal 611, when the clock controller 412 does not detect a signal from the input of the buffer 420 until a period of time, e.g., a delay time Tw of the buffer 420 and an inherent data processing time Tm of the data processor 410, has elapsed, the clock controller 412 may control the clock signal, clock_out, in a relatively low frequency.

Figure 7:
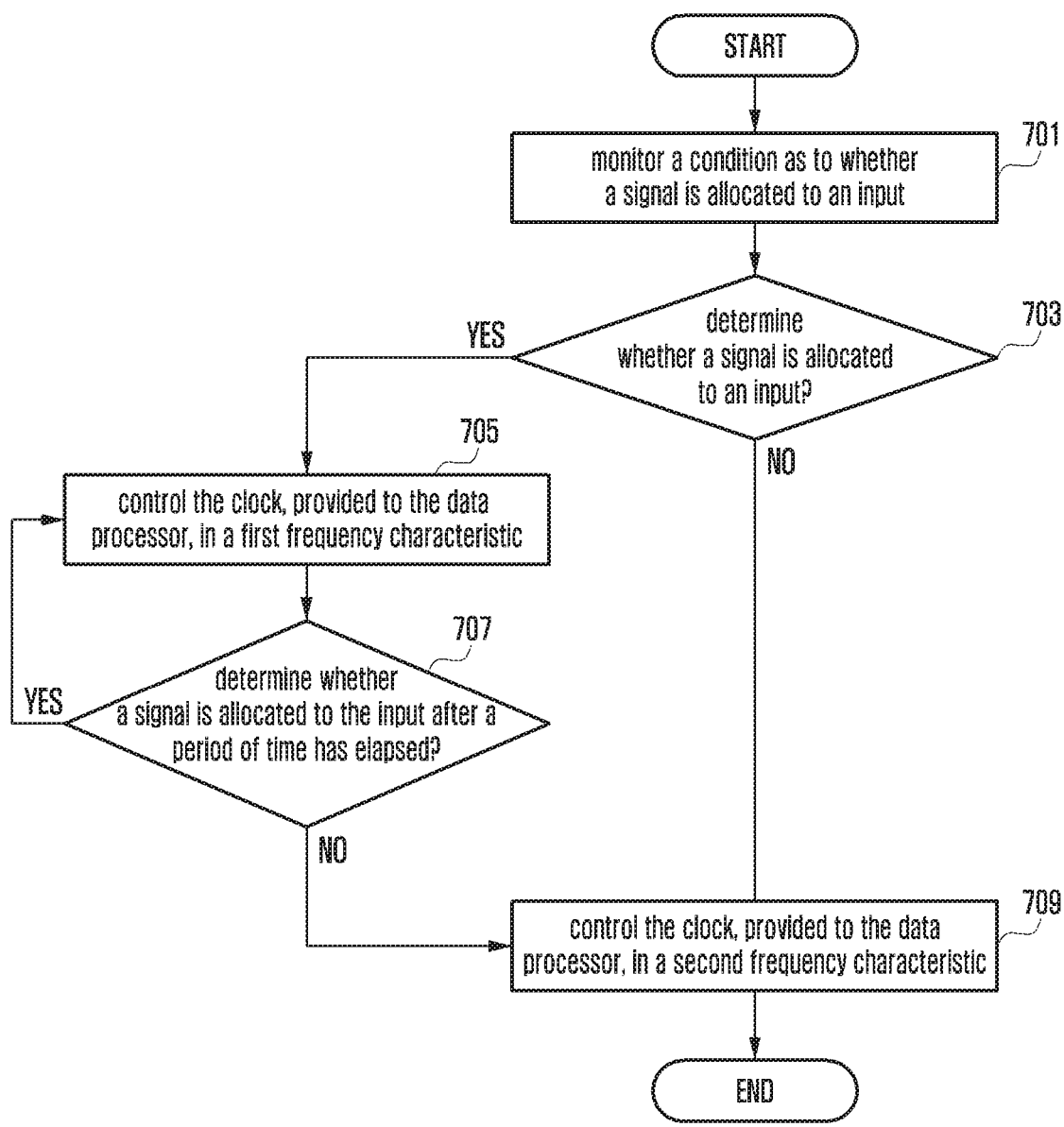
FIG. 7 is a flowchart illustrating a data processing method according to an embodiment of the present disclosure.

FIG. 7 is a flowchart illustrating a data processing method according to an embodiment of the present disclosure.

Referring to FIG. 7, the clock controller 412 is capable of monitoring a condition as to whether a signal is allocated to the input provided to the data processor 410 in operation 701. The clock controller 412 is capable of determining whether a signal is allocated to the input provided to the data processor 410 in operation 703, based on the monitoring result. When the clock controller 412 ascertains that a signal is allocated to the input provided to the data processor 410 in operation 703, the clock controller 412 is capable of controlling the clock, provided to the data processor 410, to have a first frequency characteristic in operation 705. On the other hand, when the clock controller 412 ascertains that a signal is not allocated to the input provided to the data processor 410 in operation 703, the clock controller 412 is capable of controlling the clock, provided to the data processor 410, to have a second frequency characteristic in operation 709. The first and second frequency characteristics differ from each other in that the first frequency characteristic refers to a frequency greater than the second frequency characteristic.

After controlling the clock to have a first frequency characteristic in operation 705, the clock controller 412 is capable of determining whether a signal is allocated to the input when a period of time has elapsed in operation 707. The period of time may be set to the clock controller 412, considering a time required for stabilization of the clock signal (a clock control stabilization time) and/or a data processing time that the data processor 410 inherently takes to process data. When the clock controller 412 ascertains that a signal is allocated to the input when a period of time has elapsed in operation 707, the clock controller 412 is capable of maintaining the clock, provided to the data processor 410, to have the first frequency characteristic. On the other hand, when the clock controller 412 ascertains that a signal is not allocated to the input when a period of time has elapsed in operation 707, the clock controller 412 is capable of controlling the clock, provided to the data processor 410, to have the second frequency characteristic.

According to various embodiments of the present disclosure, the digital signal processing unit of an eNB tracks (estimates) an interval where a down-link signal is not allocated and controls the clock in a relatively low frequency, thereby reducing the power consumption, in a wireless communication system employing OFDMA.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device of a base station, configured to process down-link signals in a wireless communication system employing orthogonal frequency division multiple access (OFDMA), the device comprising:
    a clock controller; and
    a data processor,
    wherein the clock controller is configured to:
        identify whether inphase/quadrature (IQ) data modulated from user data for a terminal is detected from an input signal entered into the data processor, and
        determine a frequency of clocks as a first frequency, if the IQ data modulated from the user data is detected from the input signal or the frequency of clocks as a second frequency, if the IQ data modulated from the user data is not detected from the input signal, based on the identified result, and
    wherein the data processor is configured to synchronize the input signal using the determined frequency of clocks.

2. The device of claim 1, wherein the first frequency is greater than the second frequency.

3. The device of claim 1, wherein the input signal includes at least one reference signal and IQ data modulated from control data for the terminal.

4. The device of claim 1, wherein, after the IQ data modulated from the user data is detected within a first symbol of the input signal, if the IQ data modulated from the user data is not detected within a second symbol of the input signal until a period of time has elapsed, the clock controller is further configured to control the frequency of the clocks to the second frequency.

5. The device of claim 4, wherein the period of time is set, considering at least one of a time of stabilization according to on-off operation of the data processor and a time for processing user data of the data processor.

6. The device of claim 1, wherein the clock controller is further configured to monitor an amount of the IQ data modulated from the user data and scale the first frequency based on the amount of the IQ data modulated from the user data.

7. A digital signal processing device of a base station, configured to process down-link signals in a wireless communication system employing orthogonal frequency division multiple access (OFDMA), the device comprising:
    a buffer configured to buffer an input signal;
    a clock controller configured to:
        identify whether inphase/quadrature (IQ) data modulated from user data for a terminal is detected from the input signal,
        determine a first clock corresponding to a first frequency, if the IQ data modulated from the user data is detected from the input signal or a second clock corresponding to a second frequency, if the IQ data modulated from the user data is not detected from the input signal, based on the identified result, and
        generate a clock selection control signal based on the determined clock;
    a clock providing unit configured to provide the first clock and the second clock;
    a multiplexer configured to output the first clock or the second clock in response to the clock selection control signal; and
    a data processor configured to synchronize the input signal buffered in the buffer using the output clock from the multiplexer.

8. The device of claim 7, wherein the first frequency is greater than the second frequency.

9. The device of claim 7, wherein the input signal includes at least one reference signal and IQ data modulated from control data for the terminal.

10. The device of claim 7, wherein, after the IQ data modulated from the user data is detected within a first symbol of the input signal, if the IQ data modulated from the user data is not detected within a second symbol of the input signal until a period of time has elapsed, the clock controller is further configured to generate the clock selection control signal to select the second clock by the multiplexer.

11. The device of claim 10, wherein the period of time is set, considering at least one of a time of stabilization according to on-off operation of the data processor and a time for processing user data of the data processor.

12. The device of claim 11, wherein the buffer is further configured to delay the received input signal based on the time of stabilization according to on-off operation of the data processor.

13. The device of claim 7, wherein the clock controller is further configured to:
    monitor an amount of the IQ data modulated from the user data, and
    scale the first frequency based on the amount of the IQ data modulated from the user data.

14. A method of processing data in a digital signal processing device of a base station, configured to process down-link signals in a wireless communication system employing orthogonal frequency division multiple access (OFDMA), the method comprising:
    modulating user data for a terminal to inphase/quadrature (IQ) data;
    identifying whether the IQ data modulated from the user data is detected from an input signal entered into a data processor configured to process the user data;
    providing, if the IQ data modulated from the user data is detected from the input signal, a first clock corresponding to a first frequency to the data processor; and
    providing, if the IQ data modulated from the user data is not detected from the input signal, a second clock corresponding to a second frequency to the data processor.

15. The method of claim 14, wherein the first frequency is greater than the second frequency.

16. The method of claim 14, further comprising:
    modulating control data for the terminal to inphase/quadrature (IQ) data.

17. The method of claim 15, wherein the input signal includes at least one reference signal and the IQ data modulated from the control data.

18. The method of claim 14, further comprising:
providing the second clock to the data processor, after the IQ data modulated from the user data is detected within a first symbol of the input signal, if the IQ data modulated from the user data is not detected within a second symbol of the input signal until a period of time.

19. The method of claim 14, wherein the period of time is set, considering at least one of a time of stabilization according to on-off operation of the data processor and a time for processing the user data of the data processor.

20. The method of claim 14, further comprising:
monitoring an amount of the IQ data modulated from the user data when the IQ data modulated from the user data is detected from the input signal; and
scaling the first frequency based on the amount of the IQ data modulated from the user data.

\* \* \* \* \*